(12) United States Patent
Momoka

(10) Patent No.: US 9,304,317 B2
(45) Date of Patent: Apr. 5, 2016

(54) IMAGE FORMING APPARATUS INCLUDING A SHUTTER MEMBER

(71) Applicant: CANON KABUSHIKI KAISHA, Tokyo (JP)

(72) Inventor: Toshiki Momoka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/493,601

(22) Filed: Sep. 23, 2014

(65) Prior Publication Data

US 2015/0085050 A1 Mar. 26, 2015

(30) Foreign Application Priority Data

Sep. 25, 2013 (JP) .................................. 2013-198384

(51) Int. Cl.
| | |
|---|---|
| *B41J 15/14* | (2006.01) |
| *B41J 27/00* | (2006.01) |
| *G02B 26/12* | (2006.01) |
| *G02B 27/00* | (2006.01) |
| *G03G 15/04* | (2006.01) |
| *G03G 21/16* | (2006.01) |

(52) U.S. Cl.
CPC .......... *G02B 26/125* (2013.01); *G02B 27/0006* (2013.01); *G03G 15/04045* (2013.01); *G03G 21/1666* (2013.01)

(58) Field of Classification Search
CPC ............ G03G 21/1647; G03G 15/011; G03G 15/05045; G03G 15/04072; G03G 15/0435; G03G 21/1666; G03G 2215/0132; G03G 2215/0402; B41J 29/12; B41J 2/471; B41J 2/13; G02B 26/125; G02B 27/0006; H04N 1/00; H04N 1/00909
USPC ............ 347/241, 263, 118, 256, 261; 399/98; 359/216, 216.1, 212.1
See application file for complete search history.

(56) References Cited

U.S. PATENT DOCUMENTS

| | | | |
|---|---|---|---|
| 2004/0240905 A1* | 12/2004 | Yamazaki | ........................ 399/98 |
| 2007/0024943 A1* | 2/2007 | Namba | ......................... 359/216 |
| 2007/0070173 A1* | 3/2007 | Yamakawa et al. | ........... 347/241 |

FOREIGN PATENT DOCUMENTS

JP 2009-151111 A 7/2009

* cited by examiner

*Primary Examiner* — Anh T. N. Vo
(74) *Attorney, Agent, or Firm* — Canon USA, Inc. IP Division

(57) ABSTRACT

An optical scanning apparatus and an image forming apparatus including the optical scanning apparatus, the optical scanning apparatus includes a dust-proof shutter having an opening portion. The opening portion has a side-surface opening portion and a top-surface opening portion. The side-surface opening portion is formed in a side surface of the dust-proof shutter. A cleaning member used for cleaning a dust-proof glass is inserted through the side-surface opening portion. The top-surface opening portion guides a moving direction of the cleaning member inserted through the side-surface opening portion, to a direction along a longitudinal direction of the dust-proof glass. When the dust-proof shutter is located at a first position, a light beam passed through the dust-proof glass passes through the top-surface opening portion.

14 Claims, 6 Drawing Sheets

IMAGE FORMING APPARATUS INCLUDING A SHUTTER MEMBER

BACKGROUND

1. Field of the Disclosure

The present disclosure relates to an optical scanning apparatus and an image forming apparatus. The present invention particularly relates to an optical scanning apparatus including a shutter member provided to open and close an emission portion through which a light beam passes, and an image forming apparatus including the optical scanning apparatus.

2. Description of the Related Art

In an image forming apparatus using an electrophotographic technology, such as a copying machine and a laser beam printer, a light beam emitted from an optical scanning apparatus passes through components, such as a rotating polygon mirror (a polygon mirror), a scanning lens, and a reflection mirror. The light beam is then condensed in a spot shape, on a photosensitive drum surface that is charged electrically. At this moment, an electric potential on the photosensitive drum surface changes according to intensity of the light beam, and then toner from a developing unit adheres to the photosensitive drum surface based on a latent image. A transfer unit then transfers the toner on the photosensitive drum surface to a recording medium, such as a sheet of paper. The recording medium then goes through a fixing process, so that an image is formed on the recording medium, which is then discharged to the outside of the image forming apparatus. In the image forming apparatus, dust, toner and the like (hereinafter referred to as "dust and the like") may settle on a transparent member covering the opening portion through which the light beam passes of the optical scanning apparatus. When the dust and the like settle on the transparent member, the light beam emitted from the optical scanning apparatus is partially blocked. As a result, the photosensitive drum surface is not appropriately irradiated with the light beam, thereby leading to such a problem that an image defect occurs. To address such a problem, Japanese Patent Application Laid-Open No. 2009-151111, for example, discusses an image forming apparatus including an optical scanning apparatus that has a shutter member and a cleaning member for the transparent member.

The optical scanning apparatus discussed in Japanese Patent Application Laid-Open No. 2009-151111 has a housing that houses optical components for exposure of photosensitive bodies. The housing has an emission window 212 for emitting a light beam, as illustrated in FIG. 6A. On a top surface of the housing, a slidable shutter 216 is provided with an opening 219. The image forming apparatus of Japanese Patent Application Laid-Open No. 2009-151111 further has a guide rail not illustrated. The guide rail guides a cleaning brush 215 having a brush portion 231, so that the cleaning brush 215 can move in a longitudinal direction of the emission window 212. When the cleaning brush 215 is moved towards the back side of the image forming apparatus (as indicated by a thin arrow illustrated in FIG. 6B) along the guide rail, the cleaning brush 215 comes in contact with a slant portion 213b of a rib. The shutter 216 then moves in a white arrow direction in FIG. 6B, to align the opening portion 219 and the emission window 212 with each other. In such a state that the cleaning brush 215 is in contact with a longitudinal extending portion 213a, the emission window 212 is exposed and therefore, the cleaning brush 215 can clean the emission window 212. In this way, when emission of a light beam from the optical scanning apparatus is not necessary, the shutter 216 covers the emission window 212 (See FIG. 6A), and the cleaning brush 215 removes dust and the like, when cleaning the emission window 212 (See FIG. 6B).

However, in the optical scanning apparatus discussed in Japanese Patent Application Laid-Open No. 2009-151111, when the cleaning brush 215 performs cleaning on the emission window 212, extra space in a height direction of the image forming apparatus is necessary by the thickness of the shutter 216 and the thickness of the cleaning brush 215. This may hamper downsizing of the apparatus, in the configuration of the optical scanning apparatus discussed in Japanese Patent Application Laid-Open No. 2009-151111. Moreover, due to a level difference between the shutter 216 and the emission window 212, the cleaned dust may resettle on an apparatus-front side of the emission window 212. For instance, as illustrated in FIG. 6C, the cleaning brush 215 in the optical scanning apparatus operates as follows in a conventional example. In the conventional example, there is a level difference "a" between the emission window 212 that is the emission portion for the light beam and the top surface of the shutter 216. Therefore, when being inserted from outside the image forming apparatus in a cleaning member inserting/removing direction, the cleaning brush 215 needs to be at a position that is higher than the emission window 212 by the level difference "a". In this way, when it is necessary to clean the emission window 212, space is necessary by the level difference "a" and a thickness "b" of the cleaning brush 215. Therefore, the height of the image forming apparatus increases accordingly. Further, as illustrated in FIG. 6D, the cleaning brush 215 is removed from the image forming apparatus as follows in the conventional example. As illustrated in FIG. 6D, when the cleaning brush 215 is removed from the image forming apparatus after cleaning dust on the emission window 212, the brush portion 231 of the cleaning brush 215 may be caught in the shutter 216 due to the level difference "a". This may cause the cleaned dust to fall in a corner portion "D" formed by the emission window 212 and the shutter 216, which may lead to occurrence of an image defect.

Aspects of the present invention are generally directed to a technique for removing dust on a transparent member of an optical scanning apparatus, while achieving downsizing of an apparatus.

SUMMARY

According to an aspect disclosed herein, (1) an optical scanning apparatus includes, a light source configured to emit a light beam, a deflection unit configured to deflect the light beam so that the light beam scans a photosensitive member, an optical box having a bottom on which the deflection unit is disposed and a sidewall standing from the bottom, a cover member having an opening portion of the cover through which the light beam deflected by the deflection unit passes, the cover member being attached to the sidewall to cover the optical box, a transparent member configured to cover the opening portion of the cover and through which the light beam deflected by the deflection unit passes, and a shutter member configured to move between a first position where the shutter member is retracted from a light path of the light beam, and a second position where the shutter member covers the transparent member wherein the shutter member includes an opening portion of the shutter having an insertion portion and a guide portion, the insertion portion allows a cleaning member used for cleaning the transparent member to be inserted therethrough, the guide portion of the shutter member guides a moving direction of the cleaning member inserted through the insertion portion to a direction along a longitudinal direction of the transparent member, and in a state in which the shutter member is located at the first position, the light beam passed through the transparent member passes among the guide portion of the shutter member.

According to another aspect disclosed herein, (2) an optical scanning apparatus includes, a light source configured to emit a light beam, a deflection unit configured to deflect the light beam so that the light beam scans a photosensitive member, an optical box having a bottom on which the deflection unit is disposed and a sidewall standing from the bottom, a transparent member configured to cover the opening portion of the cover and through which the light beam deflected by the deflection unit passes, and a shutter member configured to move between a first position where the shutter member is retracted from a light path of the light beam, and a second position where the shutter member covers the transparent member, wherein the shutter member has an opening portion through which the light beam passed through the transparent member passes when the shutter member is located at the first position, and wherein the opening portion of the shutter member is formed to pass through one end of the shutter member in a longitudinal direction of the opening portion, and a cleaning member used for cleaning the transparent member is inserted to the opening portion from a side of the one end of the shutter member when the cleaning member cleans the transparent member.

According to yet another aspect of the present disclosure, (3) an image forming apparatus includes, the photosensitive member, the optical scanning apparatus according to (1) or (2) configured to form an electrostatic latent image on the photosensitive member, a developing unit configured to form a toner image by developing the electrostatic latent image formed by the optical scanning apparatus, and a transfer unit configured to transfer the toner image formed by the developing unit.

Further features of the present invention will become apparent from the following description of exemplary embodiments with reference to the attached drawings.

DESCRIPTION OF THE EMBODIMENTS

Various exemplary embodiments, features, and aspects of the invention will be described in detail below with reference to the drawings.

[Image Forming Apparatus]

Figure 1A:
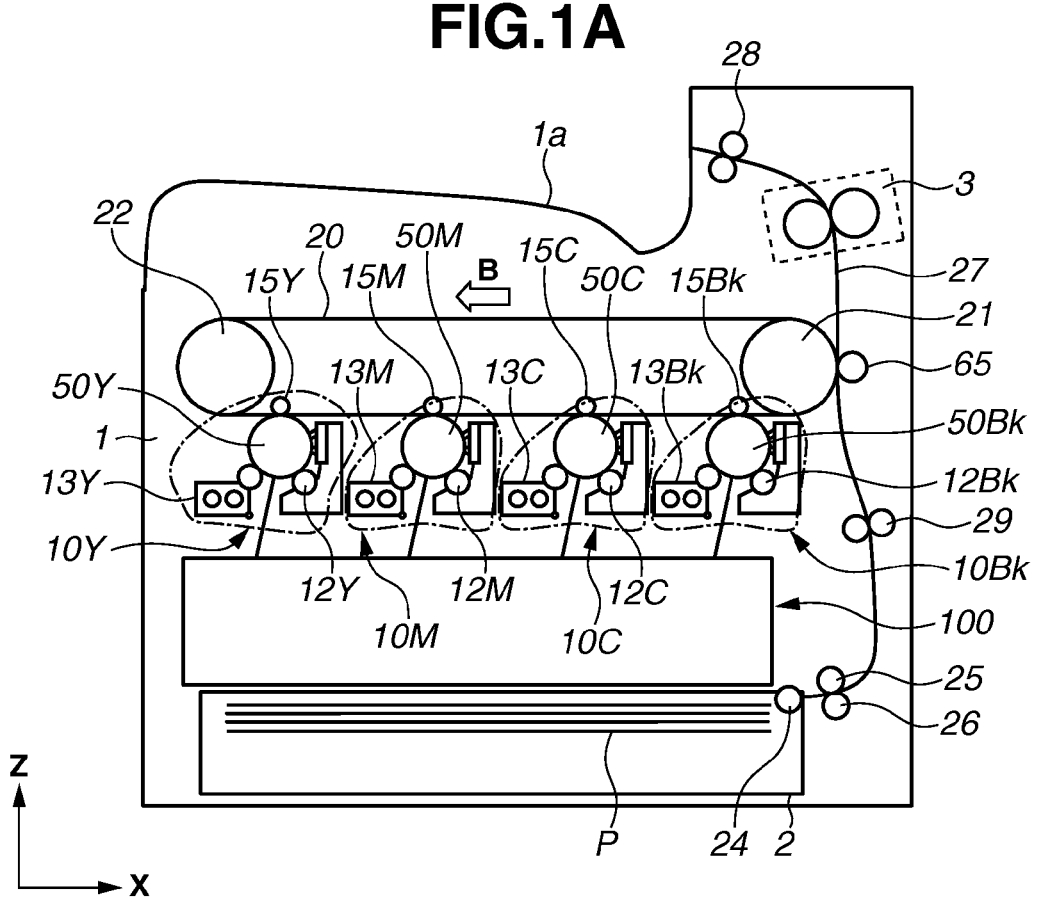
FIGS. 1A and 1B are a cross-sectional diagram and a schematic diagram illustrating an image forming apparatus and an optical scanning apparatus, respectively, according to an exemplary embodiment.

A configuration of an image forming apparatus according to an exemplary embodiment will be described. FIG. 1A is a schematic configuration diagram illustrating an overall configuration of a tandem type color laser beam printer according to the present exemplary embodiment. This laser beam printer (hereinafter referred to as "printer") includes four image forming engines 10Y, 10M, 10C, and 10Bk (indicated by a dashed line) each of which forms a toner image of yellow (Y), magenta (M), cyan (C), and black (Bk), respectively. The printer further includes an intermediate transfer belt 20 onto which the toner image is transferred from each of the image forming engines 10Y, 10M, 10C, and 10Bk. A toner image resulting from multiple transfer on the intermediate transfer belt 20 is transferred to a recording sheet P that is a recording medium, so that a full color image is formed. In the following description, the symbols of Y, M, C, and Bk representing the respective colors will be omitted, except when necessary.

The intermediate transfer belt 20 is formed in an endless belt, and held by a pair of belt conveyance rollers 21 and 22. The toner image formed by each of the image forming engines 10 is transferred to the intermediate transfer belt 20 while the intermediate transfer belt 20 is rotated in an arrow B direction. Further, a secondary transfer roller 65 is disposed at a position facing the belt conveyance roller 21, with the intermediate transfer belt 20 interposed therebetween. The recording sheet P is inserted between the secondary transfer roller 65 and the intermediate transfer belt 20 that press each other, so that the toner images are transferred from the intermediate transfer belt 20 to the recording sheet P. The four image forming engines 10Y, 10M, 10C, and 10Bk described above are disposed in parallel, below the intermediate transfer belt 20, and each transfer the toner images formed based on image information of the respective colors to the intermediate transfer belt 20 (hereinafter referred to as "primary transfer"). These four image forming engines 10 are disposed along a rotation direction (the arrow B direction) of the intermediate transfer belt 20, in order of the image forming engine 10Y for yellow, the image forming engine 10M for magenta, the image forming engine 10C for cyan, and the image forming engine 10Bk for black.

Further, an optical scanning apparatus 100 is disposed below the image forming engines 10. Based on the image information, the optical scanning apparatus 100 exposes a photosensitive drum 50 that is a photosensitive member included in each of the image forming engines 10. Detailed illustration and description of the optical scanning apparatus 100 with reference to FIG. 1A are omitted, but will be provided below with reference to FIGS. 1B and 2A. The optical scanning apparatus 100 is shared by all the image forming engines 10Y, 10M, 10C, and 10Bk, and includes four semiconductor lasers not illustrated. Each of the four semiconductor lasers emits a light beam modulated based on the image information of color. Further, the optical scanning apparatus 100 includes a rotating polygon mirror 42 and a motor unit 102. The rotating polygon mirror 42 deflects each of the light beams so that the light beam corresponding to each of the photosensitive drums 50 scans along an axial direction (a Y-axis direction) of the photosensitive drum 50. The motor unit 102 rotates the rotating polygon mirror 42. Each of the light beams deflected by the rotating polygon mirror 42 is guided onto the photosensitive drum 50 (onto the photosensitive member) by an optical member disposed in the optical scanning apparatus 100, so that the photosensitive drum 50 is exposed to the light beam.

Each of the image forming engines 10 includes the photosensitive drum 50, and a charging roller 12 that charges the photosensitive drum 50 up to a uniform background potential. Further, each of the image forming engines 10 includes a developing unit 13. The developing unit 13 forms the toner image on the photosensitive drum 50, by developing an electrostatic latent image that is formed on the photosensitive drum 50 by the exposure to the light beam. The developing unit 13 forms the toner image based on the image information of each color.

In each of the image forming engines 10, a primary transfer roller 15 is disposed at a position facing the photosensitive drum 50 with the intermediate transfer belt 20 interposed therebetween. When a predetermined transfer voltage is applied to the primary transfer roller 15, the toner image on the photosensitive drum 50 is transferred to the intermediate transfer belt 20.

The recording sheet P is fed from a sheet feed cassette 2 housed in a lower part of a printer housing 1, to the inside of the printer. Specifically, the recording sheet P is fed to a secondary transfer position where the intermediate transfer belt 20 and the secondary transfer roller 65 abut on each other. In an upper part of the sheet feed cassette 2, a pickup roller 24 and a feed roller 25 are disposed in parallel, to draw the recording sheet P stored in the sheet feed cassette 2. Further, at a position facing the feed roller 25, a retard roller 26 is disposed to prevent double feeding of the recording sheet P. A conveyance path 27 for the recording sheet P in the printer is provided almost vertically along a right-side inner surface of the printer housing 1. The recording sheet P drawn from the sheet feed cassette 2, which is located at the bottom of the printer housing 1, is sent upwards through the conveyance path 27, to a registration roller 29 that controls timing for entering of the recording sheet P into the secondary transfer position. Subsequently, the toner images are transferred to the recording sheet P at the secondary transfer position, and then the recording sheet P is sent to a fixing unit 3 (indicated by a broken line) provided downstream side in the transportation direction. The fixing unit 3 fixes the toner images on the recording sheet P. The recording sheet P is then discharged, through a discharge roller 28, to a sheet discharge tray 1a provided on an upper part of the printer housing 1.

In forming the full color image by the color laser beam printer thus configured, the optical scanning apparatus 100 exposes the photosensitive drum 50 of each of the image forming engines 10 based on the image information of each color, at predetermined timing. As a result, the latent image based on the image information is formed on the photosensitive drum 50 of each of the image forming engines 10. The image forming engine 10 may also be referred to as a process cartridge 10. To obtain a high quality image, the latent image formed by the optical scanning apparatus 100 needs to be accurately reproduced at a predetermined position on the photosensitive drum 50, and the quantity of the light beam for forming the latent image needs to be the one that achieves a desired value constantly in a stable manner.

<Description of Optical Scanning Apparatus>

Figure 1B:
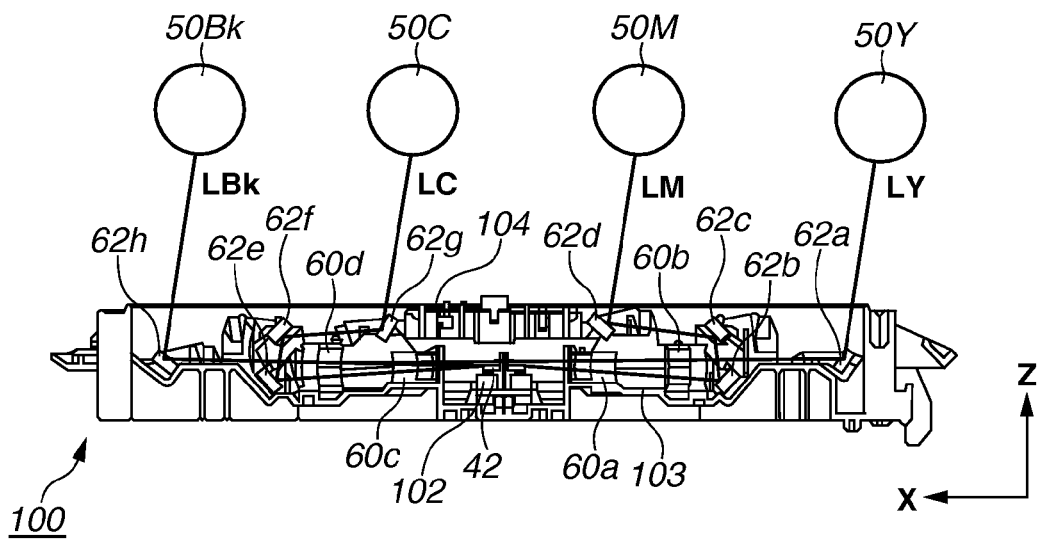
Figure 2A:
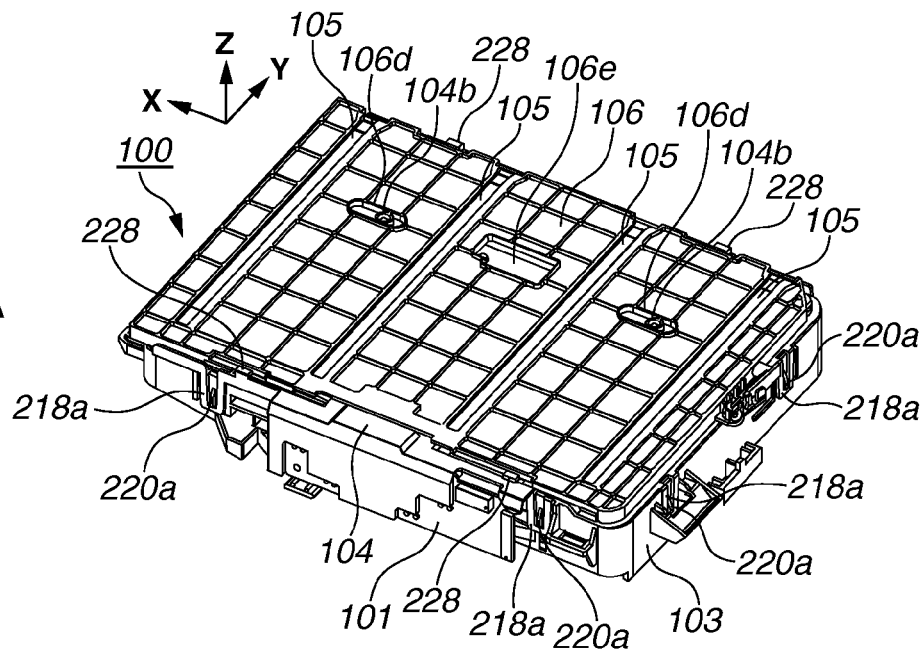
FIGS. 2A, 2B, and 2C are perspective diagrams each illustrating the optical scanning apparatus according to the exemplary embodiment.

The optical scanning apparatus 100 according to the present exemplary embodiment will be described with reference to FIGS. 1B to 5. FIG. 1B is a schematic cross-sectional diagram illustrating the optical scanning apparatus 100, and FIG. 2A is a perspective diagram illustrating the optical scanning apparatus 100. The optical scanning apparatus 100 includes a laser unit 101 that emits a light beam, the rotating polygon mirror 42 that reflects and deflects the light beam, and the motor unit 102 that drives the rotating polygon mirror 42. The optical scanning apparatus 100 further includes optical lenses 60 (60a to 60d) provided to focus the light beam to form an image on the photosensitive drum 50, and reflection mirrors 62 (62a to 62h) provided to guide the light beam onto the photosensitive drum 50. The optical scanning apparatus 100 further includes a housing 103 that is an optical box provided to fix and hold the above-described optical components. The optical scanning apparatus 100 also includes an upper cover 104 that is a cover member provided to isolate the optical components from the outside, in corporation with the housing 103, and the optical components are disposed therein. The housing 103 has a bottom and a sidewall standing from the bottom. In the bottom, the rotating polygon mirror 42 and the motor unit 102 are disposed. The upper cover 104 covers an opening surrounded by the sidewall of the housing 103. The optical scanning apparatus 100 further includes a dust-proof glass 105 that is a transparent member attached to the upper cover 104 and allowing the light beam to pass therethrough. The optical scanning apparatus 100 further includes a dust-proof shutter 106 that is a shutter member provided to prevent dust, toner and the like (hereinafter referred to as "dust and the like") from falling and settling on the dust-proof glass 105. The material of the transparent member is not limited to glass. Here, the laser unit 101 includes a light source for yellow, a light source for magenta, a light source for cyan, and a light source for black. The four light sources in total emit the light beams that eventually arrive at the surfaces of the photosensitive drums 50 of the respective image forming engines 10Y, 10M, 10C, and 10Bk. The optical scanning apparatus 100 is mounted so that the laser unit 101 faces the back side (backward side) of the image forming apparatus.

[Optical Component Support Configuration in Housing]

Components disposed in the inside and outer periphery of the optical scanning apparatus 100 include the laser unit 101 on which the light sources each emitting the light beam (a laser beam) are mounted, the rotating polygon mirror 42 deflecting the light beam, and the motor unit 102. Further, components disposed in the optical scanning apparatus 100 include the optical lenses 60a to 60d and the reflection mirrors 62a to 62h provided to guide each of the light beams onto the photosensitive drum 50 to form an image.

A light beam LY corresponding to the photosensitive drum 50Y is emitted from the light source of the laser unit 101, and deflected by the rotating polygon mirror 42. The light beam LY then enters the optical lens 60a. After passing through the optical lens 60a, the light beam LY enters the optical lens 60b. After passing through the optical lens 60b, the light beam LY is reflected by the reflection mirror 62a. The light beam LY reflected by the reflection mirror 62a passes through the dust-proof glass 105 not illustrated in FIG. 1B and scans the photosensitive drum 50Y.

A light beam LM corresponding to the photosensitive drum 50M is emitted from the light source of the laser unit 101 and deflected by the rotating polygon mirror 42. The light beam LM then enters the optical lens 60a. After passing through the optical lens 60a, the light beam LM enters the optical lens 60b. After passing through the optical lens 60b, the light beam LM is reflected by the reflection mirrors 62b, 62c, and 62d. The light beam LM reflected by the reflection mirror 62d passes through the dust-proof glass 105 not illustrated in FIG. 1B and scans the photosensitive drum 50M.

A light beam LC corresponding to the photosensitive drum 50C is emitted from the light source of the laser unit 101 and deflected by the rotating polygon mirror 42. The light beam LC then enters the optical lens 60c. After passing through the optical lens 60c, the light beam LC enters the optical lens 60d. After passing through the optical lens 60d, the light beam LC is reflected by the reflection mirrors 62e, 62f, and 62g. The light beam LC reflected by the reflection mirror 62g passes through the dust-proof glass 105 not illustrated in FIG. 1B and scans the photosensitive drum 50C.

A light beam LBk corresponding to the photosensitive drum 50Bk is emitted from the light source of the laser unit 101 and deflected by the rotating polygon mirror 42. The light beam LBk then enters the optical lens 60c. After passing through the optical lens 60c, the light beam LBk enters the optical lens 60d. After passing through the optical lens 60d, the light beam LBk is reflected by the reflection mirror 62h. The light beam LBk reflected by the reflection mirror 62h passes through the dust-proof glass 105 not illustrated in FIG. 1B and scans the photosensitive drum 50Bk.

(Upper Cover)

The upper cover 104 will be described. As illustrated in FIG. 2C, the upper cover 104 is attached to the housing 103. The upper cover 104 has a plurality of hook portions 218a. The upper cover 104 is attached to the housing 103, by a snap fit structure in which each of the plurality of hook portions 218a is engaged with a projection 220a. A plurality of the projections 220a is provided on an external wall of the housing 103. The upper cover 104 has an emission portion 104a (see FIG. 5) for emission of the light beam from inside the housing 103, onto each of the photosensitive drums 50. On the emission port 104a of the upper cover 104, the dust-proof glass 105 covering the emission portion 104a is disposed to prevent dust and the like from entering the housing 103 through the emission portion 104a. As illustrated in FIG. 2C, the upper cover 104 has a concave portion 104d and a guide portion 104b. The concave portion 104d is recessed towards the inside of the housing 103 and has a projection portion 104c. The guide portion 104b is a convex portion protruding towards the outside of the housing 103. Further, the upper cover 104 has four guide claws 228 provided to guide the dust-proof shutter 106 to be described below, so that the dust-proof shutter 106 is prevented from coming off.

(Dust-Proof Shutter)

The dust-proof shutter 106 will be described. The dust-proof shutter 106 is a member used to prevent foreign substances, such as toner, from adhering to the dust-proof glass 105 provided in the upper cover 104 illustrated in FIG. 2A. For maintenance of the image forming apparatus, a not-illustrated maintenance door is opened to detach/attach the process cartridge 10. In this operation, the toner may scatter from the process cartridge 10, due to detachment/attachment of the process cartridge 10. Therefore, at least in replacement of the process cartridge 10, it is desirable to keep the dust-proof shutter 106 in a state of covering the dust-proof glass 105 of the upper cover 104.

The dust-proof shutter 106 is a resin member shaped like a plate and facing the upper cover 104. The dust-proof shutter 106 is provided on a top surface of the upper cover 104 of the optical scanning apparatus 100. The dust-proof shutter 106 is guided by the four guide claws 228, on the upper cover 104 of the optical scanning apparatus 100, not to come off. The dust-proof shutter 106 is a member that covers the dust-proof glass 105 of the upper cover 104. The dust-proof shutter 106 has an opening portion 106a (specifically, a top-surface opening portion 106b) to be described below. Each of the light beams LY, LM, LC, and LBk is allowed to pass through the opening portion 106a, after passing through the dust-proof glass 105.

Further, an elongate hole 106e is formed in the dust-proof shutter 106. The elongate hole 106e is provided to attach a tension spring 107 that is an elastic member that will be described below. Furthermore, a rail portion 106d is formed in the dust-proof shutter 106, and the guide portion 104b of the upper cover 104 is inserted into the rail portion 106d. The rail portion 106d and the guide portion 104b form an engagement mechanism in which the rail portion 106d and the guide portion 104b are engaged with each other. The rail portion 106d and the guide portion 104b function as guide members that restrict a moving direction of the dust-proof shutter 106 to an X-axis direction.

The tension spring 107 is an elastic member that connects the dust-proof shutter 106 to the upper cover 104. The tension spring 107 constantly urges the dust-proof shutter 106 in a direction that shields the dust-proof glass 105. In normal image formation, the dust-proof shutter 106 is pushed in by a movement mechanism to be described below, in a direction that leaves the dust-proof glass 105 open. On the other hand, in maintenance, the dust-proof shutter 106 returns to a shielding position and covers the dust-proof glasses 105 for all YMCK colors of the upper cover 104 at a time. As a result, flying substances, such as toner, is prevented from adhering to the dust-proof glass 105 of the optical scanning apparatus 100. The rail portion 106d is a long hole parallel to an X-axis of the dust-proof shutter 106. Therefore, the movement of the dust-proof shutter 106 is restricted by the rail portion 106d and the guide portion 104b, to a reciprocating direction parallel to the X-axis. The dust-proof shutter 106 may be attached to the image forming apparatus side. The above-described convex portion serving as a guide portion may be provided in the dust-proof shutter 106, and a concave portion (an insertion portion) equivalent to the above-described slot serving as a rail portion may be provided in the upper cover 104. The guide portion provided in the dust-proof shutter 106 may be inserted into the rail portion provided in the upper cover 104, to be used as a guide member.

Figure 5:
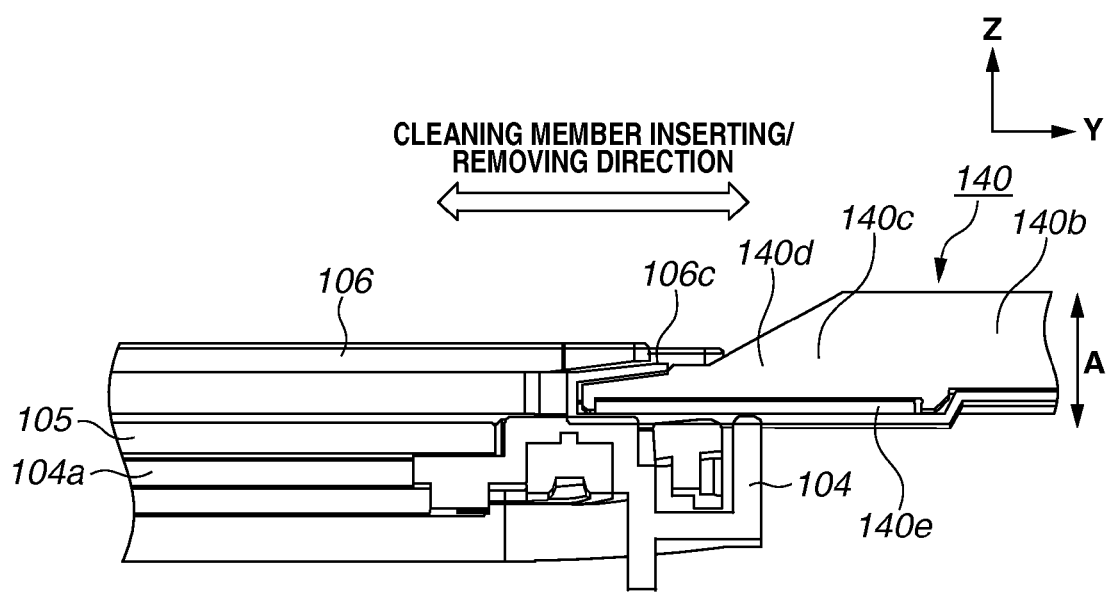
FIG. 5 is a cross-sectional diagram illustrating the optical scanning apparatus and the cleaning member, according to the exemplary embodiment.

In the present exemplary embodiment, the opening portion 106a has the top-surface opening portion 106b that is a guide portion, and a side-surface opening portion 106c that is an insertion portion. The top-surface opening portion 106b and the side-surface opening portion 106c are provided as one opening. In other words, the opening portion 106a is formed to pass through an end of the dust-proof shutter 106, the end being on a side opposite to a side where the light source is attached. Into the side-surface opening portion 106c, a cleaning member 140 provided to clean the dust-proof glass 105 is to be inserted. The top-surface opening portion 106b guides a moving direction of the cleaning member 140 inserted through the side-surface opening portion 106c, to a direction along a longitudinal direction of the dust-proof glass 105. The top-surface opening portion 106b is formed in such a manner that a length of the top-surface opening portion 106b in a longitudinal direction (a Y-axis direction) is greater than a length of the dust-proof glass 105 in the longitudinal direction. Further, the side-surface opening portion 106c is provided in such a manner that an undersurface of the side-surface opening portion 106c in a height direction (a Z-axis direction) is located at a position below or at the same level as a top surface of the dust-proof glass 105 in a height direction. In the present exemplary embodiment, as illustrated in FIG. 5, the undersurface of the side-surface opening portion 106c and the top surface of the dust-proof glass 105 are at the same height.

The side-surface opening portion 106c is provided on a side, which is opposite to a side where the laser unit 101 of the optical scanning apparatus 100 is provided. The optical scanning apparatus 100 is mounted on the image forming apparatus in such a manner that the side-surface opening portion 106c faces the front side (frontward side) of the image forming apparatus. The upper cover 104 and the dust-proof shutter 106 are connected to each other by the tension spring 107. When a link mechanism 120 to be described below presses a pressing portion 108 of the dust-proof shutter 106, a force of the tension spring 107 acts so that the dust-proof shutter 106 performs opening/closing operation.

Figure 2B:
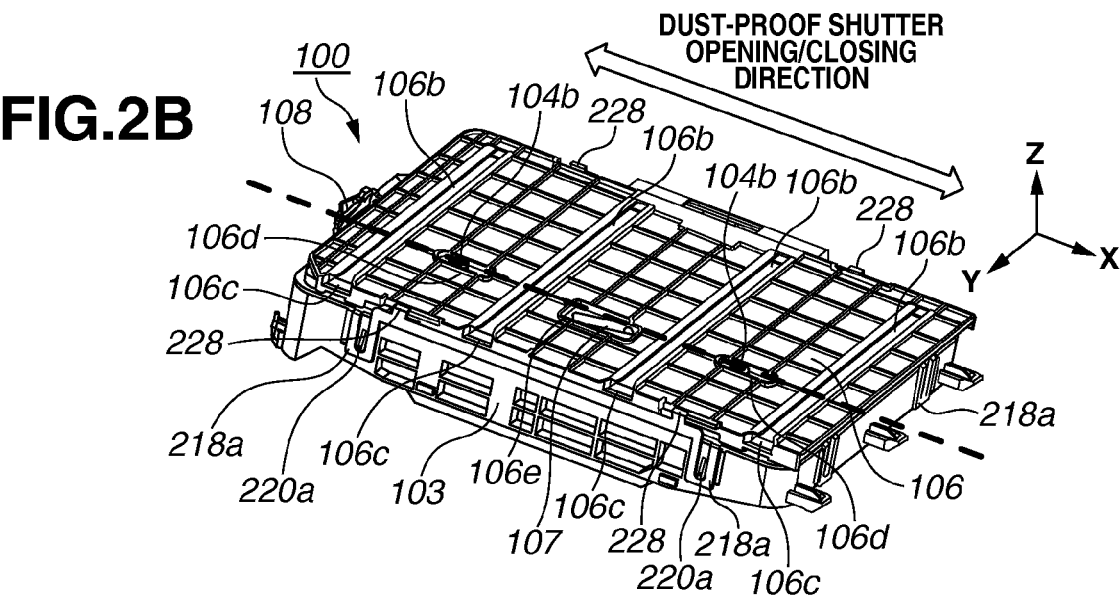
Figure 2C:
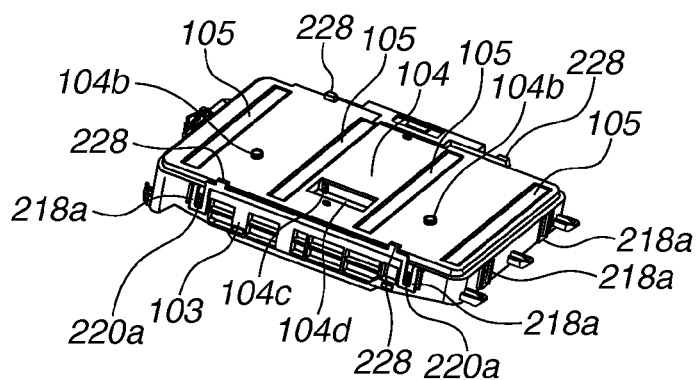

As indicated by a broken line in FIG. 2B, the pressing portion 108 is provided on the same line with the tension spring 107 and the guide portion 104b. This structure removes torque that acts when the link mechanism 120 presses the pressing portion 108. Therefore, malfunction of the dust-proof shutter 106 and minute deformation of the optical scanning apparatus 100 are suppressed. FIG. 2C illustrates a state in which the dust-proof shutter 106 is removed. The upper cover 104 and the dust-proof shutter 106 are connected to each other by securing the tension spring 107 to the projection portion 104c.

(Collected-Toner Container)

Figure 3A:
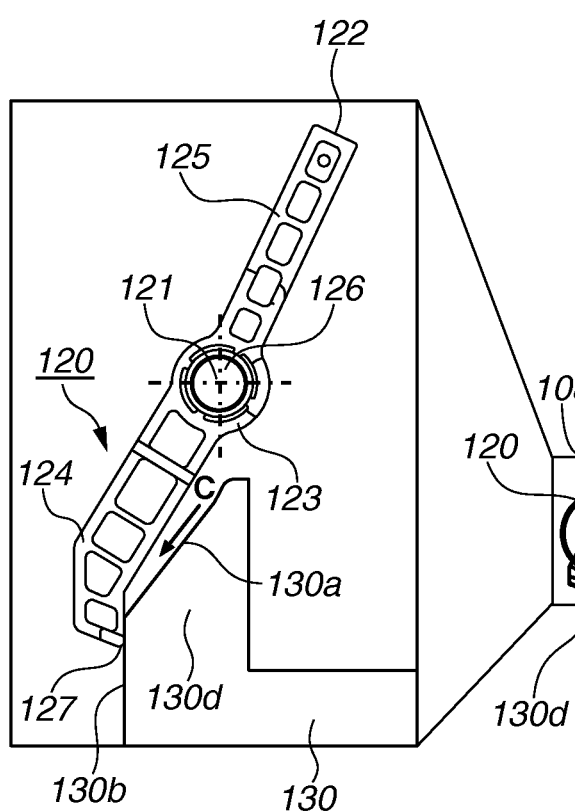
FIGS. 3A and 3B are top view diagrams each illustrating the optical scanning apparatus and a link mechanism, respectively, according to the exemplary embodiment.
Figure 3B:
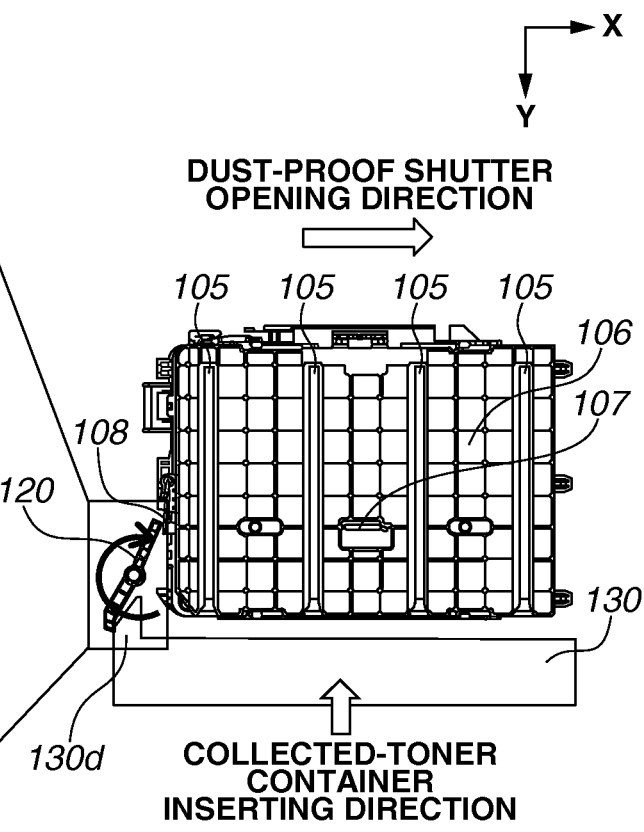
Figure 4A:
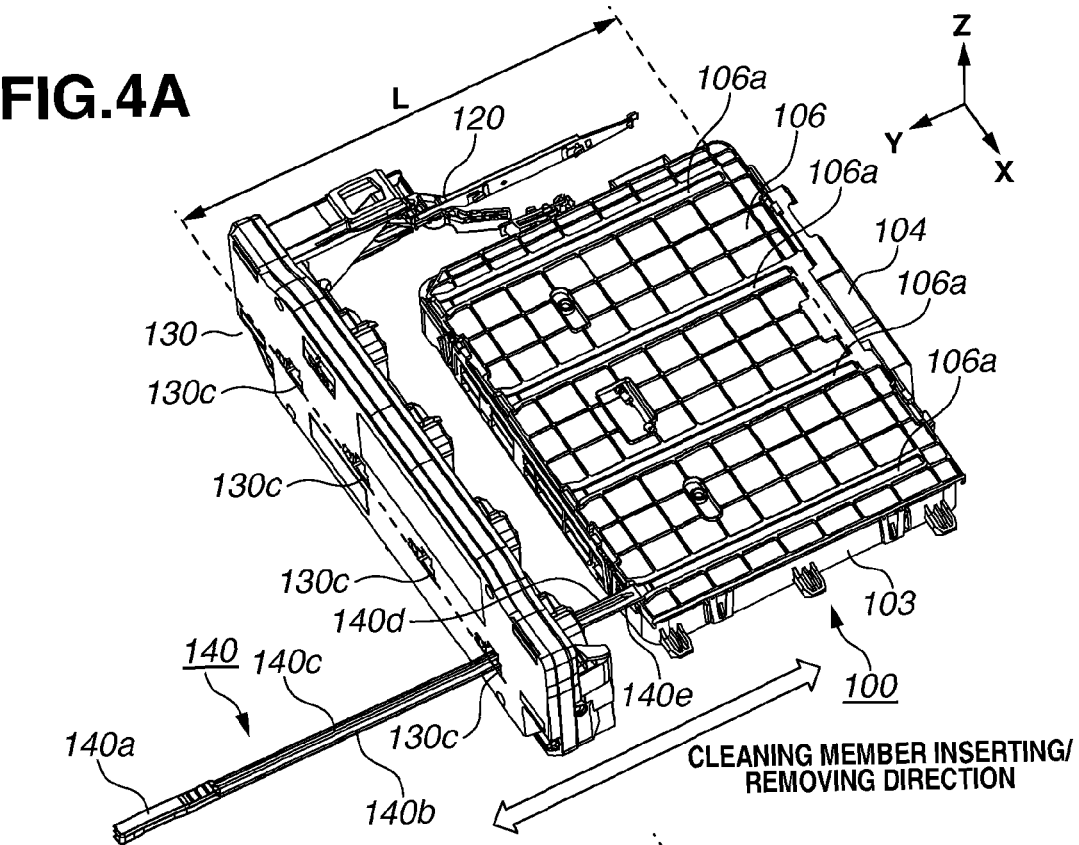
FIGS. 4A and 4B are perspective diagrams each illustrating the optical scanning apparatus, a collected-toner container, and a cleaning member, according to the exemplary embodiment.
Figure 4B:
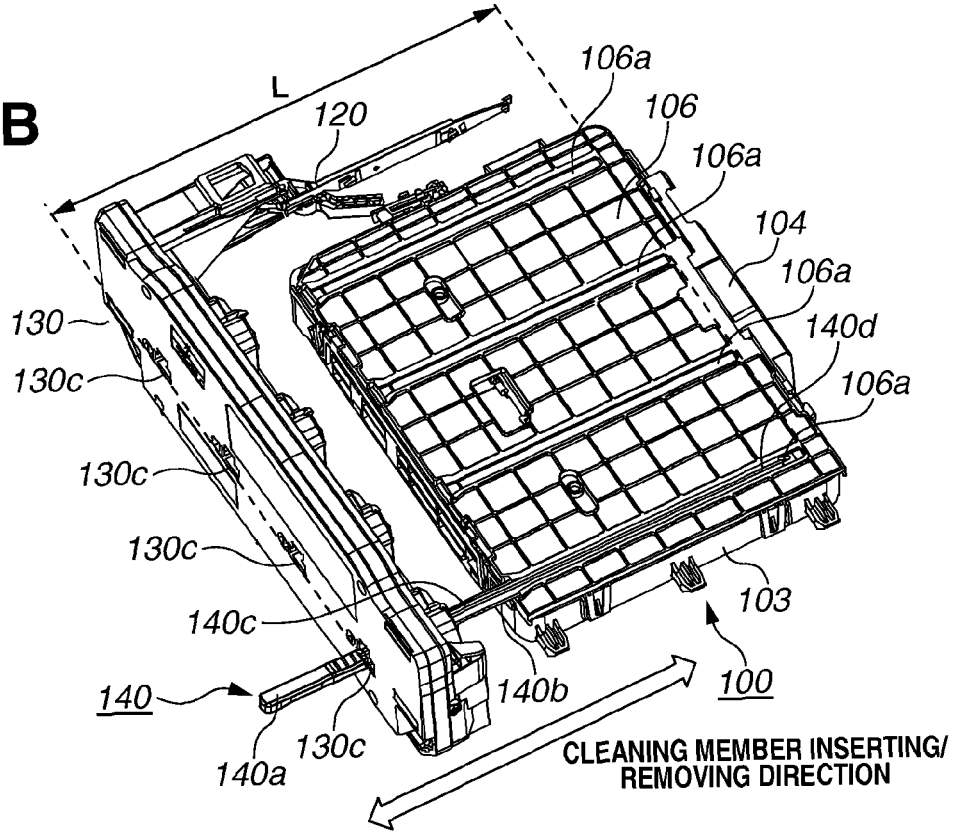

The image forming apparatus has the not-illustrated maintenance door. A side where the not-illustrated maintenance door is provided is the front side (hereinafter referred to as "frontward side") (a +Y direction) of the image forming apparatus. On the other hand, a side facing the side where the not-illustrated maintenance door is provided is the back side (hereinafter referred to as "backward side") (a −Y direction) of the image forming apparatus. A collected-toner container 130 that is a collection container is attached inside the maintenance door of the image forming apparatus. FIG. 3B is a diagram illustrating the collected-toner container 130 when viewed from above. FIGS. 4A and 4B are perspective diagrams each illustrating the collected-toner container 130. A not-illustrated cleaning device is provided to clean the toner remaining on the photosensitive drum 50 after the transfer, and is disposed downstream side of the primary transfer roller 15 in a rotation direction (a clockwise direction in FIG. 1A) of each of the photosensitive drums 50. Further, a not-illustrated cleaning device is provided to clean the toner remaining on the intermediate transfer belt 20 after the transfer, and is disposed downstream side of the secondary transfer roller 65 in the rotation direction (a counterclockwise direction in FIG. 1A) of the intermediate transfer belt 20. The collected-toner container 130 stores the toner collected from the photosensitive drum 50 and the intermediate transfer belt 20 by the cleaning devices.

The collected-toner container 130 is a unit detachably attached to a main member of the image forming apparatus. As illustrated in FIG. 3B, a user removes the collected-toner container 130 from the image forming apparatus, by moving, in the +Y direction, the collected-toner container 130 attached to the image forming apparatus. On the other hand, when the user moves the collected-toner container 130 in a collected-toner container inserting direction (the −Y direction) in FIG. 3B, the collected-toner container 130 is attached to the image forming apparatus. FIG. 3B illustrates a state in which the collected-toner container 130 is attached to the main member of the image forming apparatus. The dust-proof shutter 106 according to the present exemplary embodiment moves to shield or open the dust-proof glass 105, by interlocking with an operation for attaching/detaching the collected-toner container 130.

(Link Mechanism)

The dust-proof shutter 106 according to the present exemplary embodiment is provided to suppress adhesion of dust, toner and the like, to the dust-proof glass 105 on the emission portion 104a of the upper cover 104. The dust-proof shutter 106 moves when a mechanism for moving the dust-proof shutter 106 operates, which will be described below. According to the present exemplary embodiment, the link mechanism 120 interlocks an operation for inserting/removing (the operation for attaching/detaching) the collected-toner container 130, with the operation for opening/closing the dust-proof shutter 106.

The link mechanism 120 will be described with reference to FIGS. 3A and 3B. As illustrated in FIG. 3A, the link mechanism 120 has a shaft 121, a rotating portion 123, a first arm 124, and a second arm 125. The shaft 121 is a fixed shaft circular in cross section and provided in the main member of the image forming apparatus. The rotating portion 123, the first arm 124, and the second arm 125 are provided to configure one rotation member. The shaft 121 is provided to pass through an opening 126 provided in the rotating portion 123. The first arm 124 and the second arm 125 extend from the rotating portion 123, in a radial direction of the shaft 121. In other words, the rotation member has the rotating portion 123, the first arm 124, and the second arm 125. As illustrated in FIG. 3B, the rotation member can rotate about the shaft 121 (about the center of a circular cross section of the shaft 121), in a clockwise direction (a first direction) and a counterclockwise direction (a second direction opposite to the first direction).

When the link mechanism 120 rotates about the shaft 121, a pressing point 122 of the link mechanism 120 presses the pressing portion 108 of the dust-proof shutter 106, so that the dust-proof shutter 106 performs the opening/closing operation. The link mechanism 120 interlocks with the collected-toner container 130 attached to the image forming apparatus. Therefore, attaching the collected-toner container 130 to the image forming apparatus causes the link mechanism 120 to rotate, so that the dust-proof shutter 106 can open and close. As illustrated in FIG. 3B, the collected-toner container 130 has a projection portion 130d. The projection portion 130d has a cam surface 130a and an abutting surface 130b so that the link mechanism 120 smoothly rotates.

(Dust-Proof Shutter Moving Mechanism)

An Operation of a dust-proof shutter moving mechanism (or a dust-proof shutter opening/closing mechanism) will be described. The dust-proof shutter 106 according to the present exemplary embodiment interlocks with the operation for inserting/removing the collected-toner container 130, so that the opening/closing operation is performed. In a state before the collected-toner container 130 is attached to the image forming apparatus, the dust-proof shutter 106 covers the emission port 104a provided in the upper cover 104, and the dust-proof glass 105 on the emission port 104a. Therefore, even if the light beams LY, LM, LC, and LBk are emitted, these light beams are blocked by the dust-proof shutter 106. In the present exemplary embodiment, a state in which the dust-proof shutter 106 blocks the light beam is defined as a shutter-closed state, or a state in which the dust-proof shutter 106 is located at a second position on a light path of the light beam. On the other hand, in a state in which the collected-toner container 130 is attached to the image forming apparatus, the dust-proof shutter 106 is located at a first position where the dust-proof shutter 106 is retracted from the light path of the light beam. Therefore, each of the light beams LY, LM, LC, and LBk can pass through the emission portion 104a of the upper cover 104 and the dust-proof glass 105 on the emission portion 104a. In other words, when the dust-proof shutter 106 is located at the first position, the light beam passed through the dust-proof glass 105 passes through the top-surface opening portion 106b. In the present exemplary embodiment, the state in which the dust-proof shutter 106 does not block the light beam is defined as a shutter-opened state.

In the shutter-closed state (the state in the second position), an end portion 127 of the first arm 124 (a first moving portion)

is in contact with the cam surface 130a of the projection portion 130d of the collected-toner container 130. In addition, the pressing point 122 that is an end of the second arm 125 (a second moving portion) is in contact with the pressing portion 108 of the dust-proof shutter 106.

When the user moves the collected-toner container 130 in the collected-toner container inserting direction (a white arrow direction illustrated in FIG. 3B) (the −Y direction), the end portion 127 of the first arm 124 moves on the cam surface 130a of the projection portion 130d in an arrow C direction illustrated in FIG. 3A. The movement of the end portion 127 of the first arm 124 in the arrow C direction causes the first arm 124 to turn (move) about the shaft 121 in the clockwise direction. At the same time, the second arm 125 also turns (moves) in the clockwise direction. The pressing point 122 of the second arm 125 turned by the turning (movement) of the first arm 124 presses the dust-proof shutter 106. The pressed dust-proof shutter 106 slides in a dust-proof shutter opening direction (to the right direction in FIG. 3B) (a +X direction). When the dust-proof shutter 106 slides in the dust-proof shutter opening direction (the +X direction), the tension spring 107 extends. In other words, an elastic force of the tension spring 107 (i.e., an urging force allowing the tension spring 107 to urge the dust-proof shutter 106 in a −X direction) increases. Therefore, a force acts on the dust-proof shutter 106 in the −X direction. This keeps the pressing portion 108 of the dust-proof shutter 106 and the pressing point 122 of the second arm 125 in contact with each other.

When the user further moves the collected-toner container 130 in the collected-toner container inserting direction, the first arm 124 and the second arm 125 are turned in the clockwise direction by the movement of the collected-toner container 130. The dust-proof shutter 106 pressed by the second arm 125 slides further in the dust-proof shutter opening direction. The end portion 127 of the first arm 124 abuts on the abutting surface 130b of the projection portion 130d. The abutting surface 130b is parallel to the Y-axis. Therefore, even if the end portion 127 of the first arm 124 moves on the abutting surface 130b, the first arm 124 and the second arm 125 turn neither in the clockwise direction nor in the counterclockwise direction.

When a contact point between the first arm 124 and the abutting surface 130b of the projection portion 130d is at a position illustrated in FIGS. 3A and 3B, the collected-toner container 130 is in a state in which attachment to the image forming apparatus is completed. The abutting surface 130b is parallel to the Y-axis. Therefore, when the end portion 127 of the first arm 124 and the abutting surface 130b are in contact with each other, a force from the end portion 127 of the first arm 124 does not act on the projection portion 130d in the +Y direction. Thus providing the abutting surface 130b can suppress detachment of the collected-toner container 130 attached to the image forming apparatus, due to a factor, such as vibration.

(Cleaning Member)

FIGS. 4A and 4B are perspective diagrams each illustrating the cleaning member 140. The cleaning member 140 has a handle portion 140a and a holding portion 140b. The holding portion 140b has a projection portion 140c and a cleaning portion 140d. The projection portion 140c is provided on a surface opposite to a surface facing the dust-proof glass 105. The cleaning portion 140d is provided on the surface facing the dust-proof glass 105, and at a leading end of the holding portion 140b. The projection portion 140c is a rib provided to reinforce the holding portion 140b. The projection portion 140c serves as a guide provided to prevent the cleaning member 140 from shifting in the dust-proof shutter opening/closing direction (the ±X direction), by engaging in the top-surface opening portion 106b. As illustrated in a cross-sectional diagram of FIG. 5, the projection portion 140c slants to have a positive inclination on a YZ plane at the cleaning portion 140d.

The cleaning portion 140d has a brush portion 140e on a surface facing the dust-proof glass 105, as illustrated in FIG. 5. Dust and the like on the dust-proof glass 105 can be removed by moving the cleaning member 140 in the cleaning member inserting/removing direction while the brush portion 140e is in contact with the dust-proof glass 105. In place of the brush portion 140e, a felt-like member, for example, may be affixed to the surface of the cleaning portion 140d, the surface facing the dust-proof glass 105. When viewed from a Z-axis direction, the cleaning portion 140d has a tapered shape (a shape projected on an XY plane) that becomes gradually thinner towards an end of the holding portion 140b. This shape allows easy insertion of the cleaning member 140 into the side-surface opening portion 106c. The shape of the cleaning portion 140d is not limited to the shape in the present exemplary embodiment, and may be any shape as long as the cleaning member 140 is readily inserted into the side-surface opening portion 106c.

The holding portion 140b is configured in such a manner that only the cleaning portion 140d at the leading end is in contact with the dust-proof glass 105, and a space is formed between other parts of the holding portion 140b and the dust-proof glass 105. The holding portion 140b may have any length, as long as this length is equal to or greater than a distance L between an insertion opening 130c to be described below and an end of the top-surface opening portion 106b, which is on the laser unit 101 side. Further, the holding portion 140b may have any shape in a cross section parallel to an XZ plane, as long as this shape allows insertion into the insertion opening 130c and the side-surface opening portion 106c.

<Cleaning Method for Dust-Proof Glass>

A cleaning method for the dust-proof glass 105 according to the present exemplary embodiment will be described with reference to FIGS. 4A and 4B. In the present exemplary embodiment, the dust-proof glass 105 is cleaned when the collected-toner container 130 is in the state of being attached to the image forming apparatus, namely, when the dust-proof shutter 106 is in the opened state. The image forming apparatus includes the cleaning member 140, and the collected-toner container 130 has the insertion opening 130c through which the cleaning member 140 is inserted. Since the collected-toner container 130 is attached to the image forming apparatus, the dust-proof shutter 106 is moved in the right direction (the +X direction) in FIG. 2B by the rotation of the link mechanism 120. Therefore, the opening portion 106a is located above the emission portion 104a (above the dust-proof glass 105). In this state, the opening portion 106a (in particular, the side-surface opening portion 106c) and the insertion opening 130c are arranged in line with each other. When the cleaning member 140 is inserted into the insertion opening 130c and moved straight from the front side to the back side of the image forming apparatus (i.e., in the −Y direction) in a state in which the cleaning member 140 contacts an inside wall of the opening portion 106a, the cleaning member 140 engages with the end portion side of the opening portion 106a, namely, the side-surface opening portion 106c (see FIG. 2B) of the opening portion 106a (see FIG. 4A). The side-surface opening portion 106c also serves as a guide for the cleaning member 140. The cleaning member 140 enters into the opening portion 106a through the side-surface opening portion 106c, and cleans the dust-proof glass 105. When being moved straight further, the cleaning member 140 comes to the end of the top-surface opening portion 106b (see FIG. 4B). The top-surface opening portion 106b is provided to be wider than the dust-proof glass 105 in the insertion direction of the cleaning member 140. Therefore, when the cleaning member 140 comes to the end portion of the top-surface opening portion 106b, the entire range on the dust-proof glass 105 is cleaned. The cleaning member 140 is then drawn from the image forming apparatus, which completes the cleaning of the dust-proof glass 105.

Figure 6A:
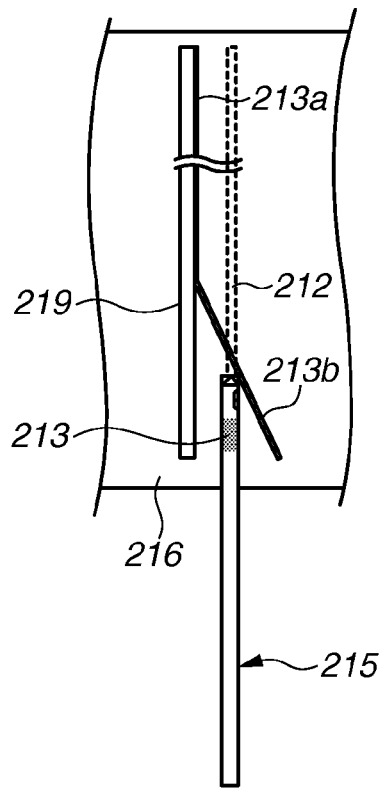
FIGS. 6A, 6B, 6C and 6D are schematic diagrams each illustrating an optical scanning apparatus of a conventional example.
Figure 6B:
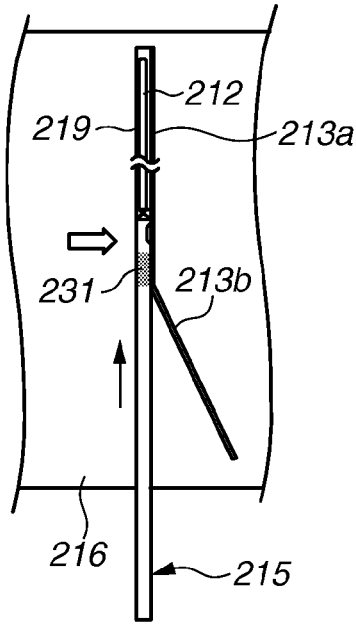
Figure 6C:
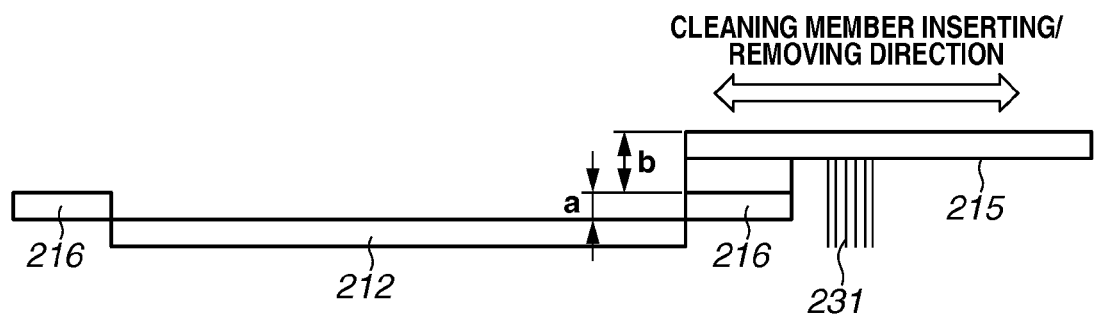
Figure 6D:
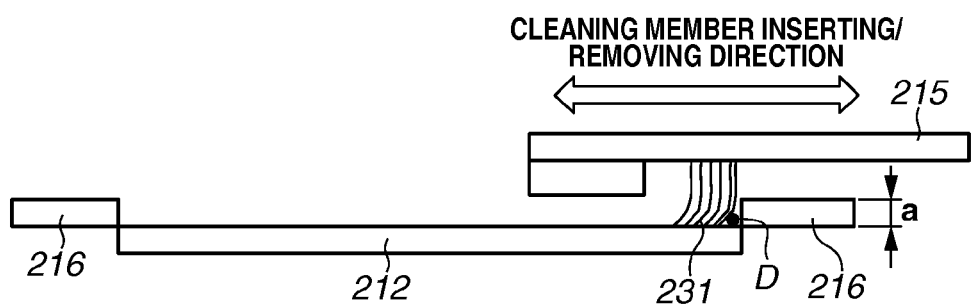

In the present exemplary embodiment, the undersurface of the side-surface opening portion 106c is provided at the position below or at the same level as the top surface of the dust-proof glass 105, in the height direction of the image forming apparatus. For this reason, the cleaning member 140 is not caught on the dust-proof shutter 106, when being drawn from the opening portion 106a. The cleaning member 140 has the projection portion 140c that is the rib for reinforcement. However, since the top-surface opening portion 106b and the side-surface opening portion 106c form one opening, cleaning on the dust-proof glass 105 can be performed without contact between the opening portion 106a and the lib. Therefore, the only space necessary for the cleaning of the dust-proof glass 105 corresponds to the height (indicated by "A" illustrated in FIG. 5) of the cleaning member 140 (i.e., corresponding to the thickness b in the conventional example illustrated in FIG. 6C). For this reason, in the optical scanning apparatus 100 according to the present exemplary embodiment, the cleaning can be performed in more space-saving manner than that in the image forming apparatus of the conventional example, by the level difference "a" illustrated in FIG. 6C. Moreover, nothing interrupts the operation for inserting/removing the cleaning member 140 in the inserting/removing direction of the cleaning member 140. Therefore, dust adhering to the cleaning member 140 in a cleaning process does not resettle on the dust-proof glass 105 by being caught on an obstacle (see the situation at the corner portion "D" illustrated in FIG. 6D). Accordingly, cleaning on the dust-proof glass 105 can be performed more reliably.

As described above, according to the present exemplary embodiment, it is possible to perform cleaning without leaving dust on a transparent member of an optical scanning apparatus, while achieving downsizing of an apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-198384 filed Sep. 25, 2013, which is hereby incorporated by reference herein in its entirety.

What is claimed is:

1. An image forming apparatus comprising:
  a light source configured to emit a light beam;
  a deflection unit configured to deflect the light beam so the light beam scans a photosensitive member;
  an optical box having a bottom on which the deflection unit is disposed and a sidewall extending from the bottom;
  a cover member having an opening portion through which the light beam deflected by the deflection unit passes, the cover member being attached to the sidewall to cover the optical box;
  a transparent member configured to cover the opening portion of the cover member and through which the light beam deflected by the deflection unit passes; and
  a shutter member configured to move between a first position where the shutter member is retracted from a light path of the light beam, and a second position where the shutter member covers the transparent member,
  wherein the shutter member includes an opening through which the light beam passed through the transparent member passes in a state where the shutter member is located at the first position, and the opening of the shutter member includes an insertion portion for inserting a cleaning member used for cleaning the transparent member.

2. The image forming apparatus according to claim 1, wherein an undersurface of the insertion portion is provided at a position below or at a same level as a top surface of the transparent member in a height direction.

3. The image forming apparatus according to claim 1, wherein the shutter member includes a guide portion configured to form the opening of the shutter member and configured to guide the cleaning member inserted through the insertion portion to a direction along a longitudinal direction of the transparent member, wherein a length of the guide portion of the shutter member in the longitudinal direction is greater than a length of the transparent member in the longitudinal direction.

4. The image forming apparatus according to claim 1, further comprising:
  an elastic member configured to connect the cover member and the shutter member to each other,
  wherein the elastic member urges the shutter member in a moving direction to the second position.

5. The image forming apparatus according to claim 1, further comprising:
  a cleaning unit configured to clean toner remaining on the photosensitive member after transfer by a transfer unit of the image forming apparatus; and
  a detachably attached collection container configured to collect the toner cleaned by the cleaning unit,
  wherein the collection container has an insertion opening provided to guide the cleaning member to the insertion portion.

6. The image forming apparatus according to claim 5, wherein the shutter member moves between the first position and the second position by interlocking with an attachment/detachment operation of the collection container.

7. The image forming apparatus according to claim 6, wherein the shutter member is located at the first position, in a state in which the collection container is attached, and the shutter member is located at the second position, in a state in which the collection container is detached.

8. An image forming apparatus comprising:
  a light source configured to emit a light beam;
  a deflection unit configured to deflect the light beam so the light beam scans a photosensitive member;
  an optical box having a bottom on which the deflection unit is disposed and a sidewall extending from the bottom;
  a cover member having an opening portion of the cover and through which the light beam deflected by the deflection unit passes, the cover member being attached to the sidewall to cover the optical box;
  a transparent member configured to cover the opening portion of the cover member and through which the light beam deflected by the deflection unit passes; and
  a shutter member configured to move between a first position where the shutter member is retracted from a light path of the light beam, and a second position where the shutter member covers the transparent member, wherein the shutter member has an opening through which the light beam passed through the transparent member passes when the shutter member is located at the first position, and wherein the opening of the shutter member is formed to pass through one end of the shutter member in a longitudinal direction of the opening of the shutter member, the opening of the shutter member includes an insertion portion for inserting a cleaning member used for cleaning the transparent member, and the insertion portion is provided at a side of the one end of the shutter member.

9. The image forming apparatus according to claim 8, wherein the one end of the shutter member is on a side that is opposite a side where the light source is attached.

10. The image forming apparatus according to claim 8, wherein a length of the opening of the shutter member in the longitudinal direction is greater than a length of the transparent member in the longitudinal direction.

11. The image forming apparatus according to claim 8, further comprising:
an elastic member configured to connect the cover member and the shutter member to each other,
wherein the elastic member urges the shutter member in a moving direction moving to the second position.

12. The image forming apparatus according to claim 8, further comprising:
a cleaning unit configured to clean toner remaining on the photosensitive member after transfer by a transfer unit of the image forming apparatus; and
a detachably attached collection container configured to collect the toner cleaned by the cleaning unit,
wherein the collection container has an insertion opening provided to guide the cleaning member to the opening of the shutter member.

13. The image forming apparatus according to claim 12, wherein the shutter member moves between the first position and the second position by interlocking with an attachment/detachment operation of the collection container.

14. The image forming apparatus according to claim 13, wherein the shutter member is located at the first position in a state in which the collection container is attached, and the shutter member is located at the second position in a state in which the collection container is detached.

* * * * *